US008755741B2

(12) United States Patent
Busson

(10) Patent No.: US 8,755,741 B2
(45) Date of Patent: Jun. 17, 2014

(54) RECEIVE UNIT FOR RECEPTION OF MULTIPLE SATELLITE SIGNALS

(75) Inventor: Pierre Busson, Grenoble (FR)

(73) Assignee: STMicroelectronics S.A., Montrouge (FR)

( * ) Notice: Subject to any disclaimer, the term of this patent is extended or adjusted under 35 U.S.C. 154(b) by 857 days.

(21) Appl. No.: 12/902,598

(22) Filed: Oct. 12, 2010

(65) Prior Publication Data

US 2011/0085626 A1 Apr. 14, 2011

(30) Foreign Application Priority Data

Oct. 13, 2009 (FR) ...................................... 09 57169

(51) Int. Cl.
*H04B 7/185* (2006.01)
(52) U.S. Cl.
USPC ............................ 455/12.1; 455/427; 370/316
(58) Field of Classification Search
CPC .. H04B 7/185; H04B 7/1851; H04B 7/18513; H04B 7/18523; H04H 20/74
USPC ................. 455/12.1–13.4, 427–430; 370/316
See application file for complete search history.

(56) References Cited

U.S. PATENT DOCUMENTS

| 7,130,576 B1 | 10/2006 | Gurantz et al. |
| 2002/0171584 A1 | 11/2002 | Walker et al. |

FOREIGN PATENT DOCUMENTS

EP 2 104 179 A1 3/2008

OTHER PUBLICATIONS

French Search Report dated Jun. 24, 2010 from corresponding French Application No. 09/57169.

*Primary Examiner* — Raymond Dean
(74) *Attorney, Agent, or Firm* — Wolf, Greenfield & Sacks, P.C.

(57) ABSTRACT

A satellite receive unit for receiving a plurality of satellite signals from a plurality of satellites, the satellite receive unit including: a plurality of low noise blocks each for receiving one or more of the satellite signals and providing a received signal, at least one of the low noise blocks receiving a plurality of the satellite signals; and a satellite signal processing unit including a plurality of branches each arranged to receive a corresponding one of the received signals from the plurality of low noise blocks, each branch having a multiplier arranged to weight the received signal by multiplying by a corresponding coefficient; and an adder arranged to add the weighted signals of each branch to generate an output satellite signal.

32 Claims, 2 Drawing Sheets

RECEIVE UNIT FOR RECEPTION OF MULTIPLE SATELLITE SIGNALS

CROSS REFERENCE TO RELATED APPLICATIONS

This application claims the priority benefit of French patent application Ser. No. 09/57169, filed on Oct. 13, 2009, entitled "RECEIVE UNIT FOR RECEPTION OF MULTIPLE SATELLITE SIGNALS," which is hereby incorporated by reference to the maximum extent allowable by law.

BACKGROUND OF THE INVENTION

1. Field of the Invention

The present invention relates to a receive unit for reception of a plurality of satellite signals, and in particular to a receive unit for extracting a selected satellite signal from a plurality of satellite signals received via a plurality of low noise blocks.

2. Discussion of the Related Art

A satellite receive unit, for example the unit often referred to as an outdoor unit, comprises one or multiple LNBs (Low Noise Blocks), each arranged to amplify a satellite signal received via a parabolic satellite dish. The satellite signal for example conveys sound and/or video data, such as television signals or radio signals. Each LNB is designed to introduce as little noise as possible, which is typically in the order of 1 decibel.

The satellite signal as received by the LNB is modulated on a carrier signal, for example in a frequency band of 10.4-12.7 GHz. Within this frequency band, there are a number of channels each corresponding to a particular data stream that may comprise video and/or audio data of one or more television and/or radio broadcasts. The bandwidth of each channel is typically between 8 and 30 MHz.

Satellite receive units have been proposed that may receive signals from multiple satellites.

FIG. 1 illustrates part of a satellite system comprising satellites 102, 104, each of which is on a geostationary orbit and transmits a satellite signal. The satellite signal from each of the satellites is, for example, in the band 10.4 to 12.7 GHz. A receive unit 106 for receiving one or both satellite signals comprises for example a pair of LNBs, each aimed at a corresponding one of the satellites. One of the LNBs, for example, has a receive intensity distribution corresponding to the frontal lobe 108A and side lobes 108B and 108C, while a second LNB has a receive intensity distribution illustrated by a frontal lobe 110A and side lobes 110B and 110C.

In order for each of the LNBs to be able to correctly receive a satellite signal from a corresponding satellite, the satellites 102 and 104 are spatially separated to allow an angle of at least a between them with respect to the satellite receive unit 106. Angle α is generally in the order of 6 degrees. For example, in France, the Astra19 satellite is positioned at longitude 19° E, and the Hotbird satellite is positioned at longitude 13° E, leaving an angle of 6° longitude between the satellites such that a single satellite receiver may distinguish the signals.

Satellites for television broadcasts are generally positioned on geostationary orbits above the equator. The constraint that each satellite needs to be 6 degrees apart means that there is limited space for satellites in this region. In order to offer more services, it would be advantageous to allow more satellites to be launched in a more closely packed configuration. However, a problem is that known satellite receive units are generally not adapted to correctly receive signals from satellites closer together than 6 degrees.

SUMMARY OF THE INVENTION

It is an aim of embodiments described herein to at least partially address one or more problems in the prior art.

According to one aspect of the present invention, there is provided a satellite receive unit for receiving a plurality of satellite signals from a plurality of satellites, the satellite receive unit comprising: a plurality of low noise blocks each for receiving one or more of said satellite signals and providing a received signal, at least one of said low noise blocks receiving a plurality of said satellite signals; and a satellite signal processing unit comprising: a plurality of branches each arranged to receive a corresponding one of the received signals from the plurality of low noise blocks, each branch comprising a multiplier arranged to weight the received signal by multiplying by a corresponding coefficient; and an adder arranged to add the weighted signals of each branch to generate an output satellite signal. For example, the satellite receive unit comprises an antenna, such as a parabolic antenna, adapted for the reception of satellite signals.

According to one embodiment, each of the plurality of low noise blocks is arranged to receive a plurality of the satellite signals.

According to another embodiment, at least two of said plurality of low noise blocks is arranged to receive a plurality of said satellite signals, and at least one of said low noise blocks is arranged to receive a single satellite signal.

According to another embodiment, the satellite signal processing unit comprises an analog to digital converter in each branch arranged to convert the signal from each of said low noise blocks into a digital signal.

According to another embodiment, the satellite signal processing unit further comprises a Fourier transform block arranged to transform the digital signal from said analog to digital converter into the frequency domain, wherein the multiplication performed by said multiplier and the addition performed by said adder are performed in the frequency domain, the satellite receive unit further comprising an inverse Fourier Transform block arranged to reconvert the output signal into a time domain signal.

According to another embodiment, the multiplier in each branch is arranged to multiply the corresponding combined signal by a coefficient determined based on a selected satellite signal.

According to another embodiment, the satellite signal processing unit further comprises, in each branch, a phase correction block arranged to introduce a phase adjustment to the corresponding combined signal.

According to another embodiment, the satellite signal processing unit comprises at least three branches.

According to another embodiment, the satellite receive unit comprises three low noise blocks, each arranged to receive a plurality of satellite signals.

According to another embodiment, the satellite receive unit comprises an input indicating which of the plurality of satellite signals is to be output by the satellite receive unit as the output satellite signal.

According to another aspect of the present invention, there is provided a satellite receive system comprising the above satellite receive unit, and a transmission means arranged to transmit the output signal from the satellite signal processing unit to at least one satellite decoder. Additionally, the satellite receive system may comprise one or more decoders adapted to decode a video transmission of the output satellite signal.

According to a further aspect of the present invention, there is provided a satellite system comprising at least two satellites separated by 5 or less degrees of longitude, and the above satellite receive unit.

According to a further aspect of the present invention, there is provided a satellite system comprising at least three satellites each separated from at least one of the other two satellites by 5 or less degrees of longitude, and the above satellite receive unit.

According to a further aspect of the present invention, there is provided a satellite system comprising: at least two satellites in geostationary orbit separated from each other by less than 6 degrees of longitude; and a decoder arranged to receive a combined signal comprising satellites signals from each of said satellites having at least partially overlapping frequency bands, and to extract one of said satellite signals from said combined signal.

According to a further aspect of the present invention, there is provided a method of receiving a plurality of satellite signals from a plurality of satellites comprising: receiving by each of a plurality of low noise blocks one or more of said plurality of satellite signals, at least one of said low noise blocks receiving a plurality of said satellite signals; and receiving, by each of a plurality of branches, a corresponding signal from the plurality of low noise blocks, and multiplying the signal by a corresponding coefficient to weight each signal; and adding by an adder the weighted signals of each branch to generate an output satellite signal.

BRIEF DESCRIPTION OF THE DRAWINGS

The foregoing and other purposes, features, aspects and advantages of the invention will become apparent from the following detailed description of embodiments, given by way of illustration and not limitation with reference to the accompanying drawings, in which.

DETAILED DESCRIPTION

Figure 2:
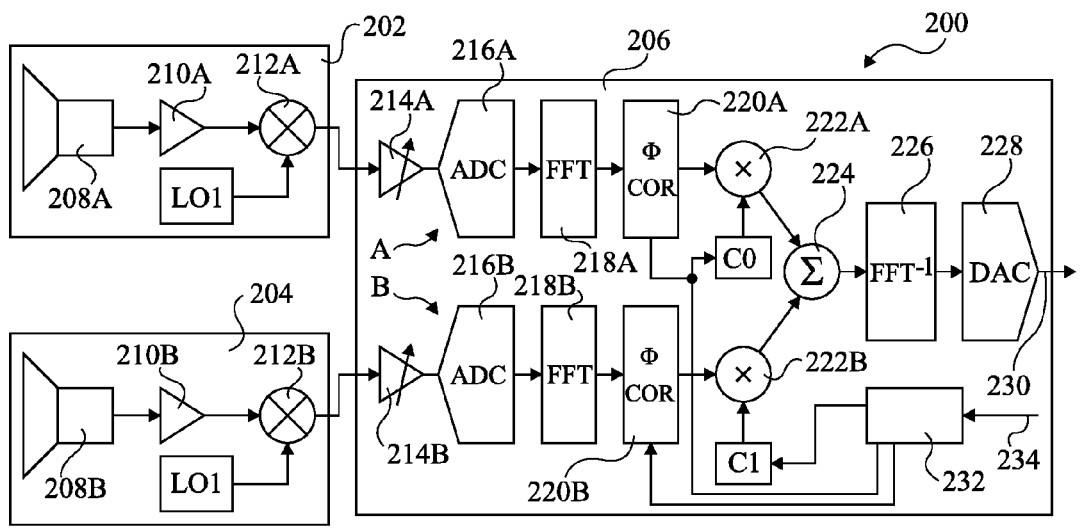
FIG. 2 illustrates a satellite receive unit according to an embodiment of the present invention.

FIG. 2 illustrates a satellite receive unit 200 comprising first and second LNBs 202, 204, and a satellite signal processing unit 206, which receives the signals from the LNBs 202 and 204, and combines these signals to generate a signal corresponding to a "wanted" satellite signal. In particular, as explained in more detail below, the LNBs 202, 204 are each adapted to receive at least two different satellite signals at the same time, and based on the satellite broadcast that a user wishes to view, the satellite signal processing unit 206 is adapted to extract the corresponding satellite signal from the received signals.

The LNB 202 comprises a receive head 208A, which is adapted to receive at the same time a plurality of satellite signals in a same frequency band, each satellite signal having the same polarization, for example linear (horizontal or vertical) or circular (clockwise or anticlockwise) polarisation.

The output of the receive head 208A is provided to a low noise amplifier 210A, which for example introduces less than 1 dB of noise. The output of amplifier 210A is provided to a mixer 212A, which frequency shifts the satellite signals to a band suitable for processing by the satellite processing unit 206. In some embodiments, the satellite signal is received at a frequency band of 10.4 to 12.7 GHz, and the mixer 212A shifts a portion of this frequency band to a base band, for example the band 0 to 500 MHz, although other bands are possible. The corresponding mixing frequency is provided to the mixer 212A by a local oscillator LO1.

LNB 204 is for example identical to LNB 202, and comprises a corresponding receive head 208B, amplifier 210B, mixer 212B, and local oscillator LO1 providing the same mixing frequency as the local oscillator of mixer 212A. Furthermore, it is adapted to receive a plurality of satellite signals having the same polarization and frequency band as LNB 202. Alternatively, the LNB 204 could be adapted to receive a satellite signal of the same polarization as the LNB 202, but in a slightly different frequency band, for example a frequency band that at least partially overlaps the frequency band of the signal received by LNB 202.

The outputs from the mixers 212A and 212B of the LNBs 202, 204 are provided to the satellite signal processing unit 206, and in particular to respective branches A and B. The signal from LNB 202 is provided to the branch A comprising a variable amplifier 214A, an analog to digital converter (ADC) 216A, a fast Fourier transform (FFT) block 218A, a phase correction block 220A and a multiplier 222A. The signal from LNB 204 is provided to the branch B comprising a variable amplifier 214B, an ADC 216B, an FFT block 218B, a phase correction block 220B and a multiplier 222B.

The variable amplifiers 214A, 214B for example amplify the signals to an appropriate level for input to the ADCs 216A, 216B.

The ADCs 216A, 216B then sample the signals, for example at a sampling frequency in the region of 1 GHz. The ADC blocks 216A and 216B for example generate samples of between 8 and 12 bits.

The outputs of the ADCs 216A, 216B are provided to the respective FFT blocks 218A, 218B, which translate the digital signals from the time domain to the frequency domain. Zero padding is for example applied to the samples prior to Fourier transformation. For applying the FFT operation, the samples are treated in blocks of for example 1024 or 2048 samples. The FFT operation results in blocks of frequency values, each block for example comprising 1024 values of between 8 and 12 bits.

Phase corrections $\Phi 0$ and $\Phi 1$ are then applied by the phase correction blocks 220A and 220B respectively, allowing some compensation for the transmission paths of the satellite signals. While not represented in FIG. 2, the signals in each branch A and B have complex components (I and Q), and each value can thus be represented in the form $a+bj$. A phase correction is applied in to the frequency domain by a multiplication of each value by the corresponding complex value $\Phi 0$, $\Phi 1$.

The phase corrected signals from blocks 220A, 220B are provided to respective multipliers 222A and 222B, which multiply the signals by corresponding coefficients C0 and C1 respectively. The multiplication by the multipliers 222A and 222B is for example applied to the samples in sequence. The values of the coefficients C0 and C1 will depend on which satellite signal is to be received. This multiplication has the effect of giving the signals received by each LNB 202, 204 a different weight and phase. Again, the coefficients C0 and C1 have a complex form a+bj. In some implementations, the phase correction blocks 220A, 220B and multipliers 222A, 222B are combined in a simple block that performs a single multiplication to perform phase correction and weighting. For example, in branches A and B, single multiplications could be performed based on respective coefficients C0'=C0×Φ0 and C1'=C1×Φ1.

It will be apparent to those skilled in the art that the phase correction values Φ0, Φ1 and coefficients C0, C1 will depend on the positioning of the satellites and the antenna system. In some embodiments these values can be programmed in a lookup table for a particular group of satellites viewed from a particular country or region. Alternatively, these values could be determined during a set-up phase of the satellite receive unit, for example by scanning values of Φ0, Φ1, C0, C1 in given ranges to find an appropriate combination corresponding to each satellite signal.

The frequency domain signals from the two branches are then combined. In particular, the corresponding samples of the weighted signals from multipliers 222A, 222B are added together bit by bit by an adder 224.

The result of this addition is provided to an inverse FFT block 226, which reconverts the frequency domain signal into the time domain. The time domain signal is then provided to a digital to analog converter 228, which converts the digital signal to an analogue signal suitable for transmission over a coaxial cable 230. Alternatively, the satellite signal could be transmitted via powerline communication, according to which data signals are transmitted on a conductor usually used for transmission of mains power through a building. Thus, rather than being a coaxial cable, cable 230 could be a power line. Furthermore, in alternative embodiments, the satellite signal could be transmitted via a wireless interface, such as a WiFi (wireless fidelity) connection.

A control block 232 receives a selection signal on an input line 234, indicating the satellite signal that is desired to be viewed by a user. This selection signal is for example provided via the cable 230, or alternatively by other means, such as via a wireless connection, or a switch on one side of the receive unit. Based on the desired satellite signal, the control block 232 generates, for example by use of a look-up table, the coefficient values C0 and C1 to multipliers 222A, 222B and phase correction values to the phase correction blocks 220A and 220B. The same coefficients C0 and C1 and phase correction values are for example valid for reception of a given satellite signal.

Operation of the satellite receive units 200 of FIG. 2 will now be described further with reference to FIGS. 3A to 3C.

Figure 3A:
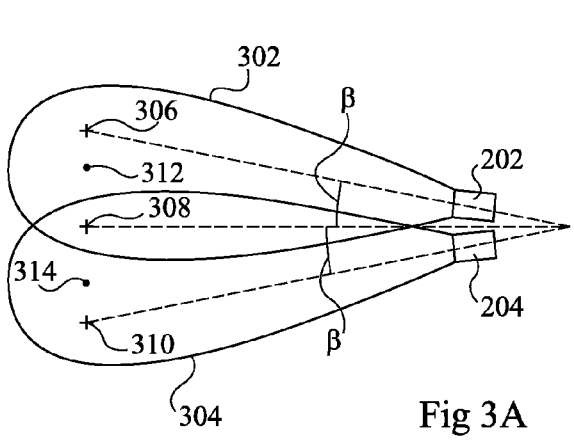
FIG. 3A illustrates satellite positioning based on the embodiment of FIG. 2 according to an embodiment of the present invention.

FIG. 3A illustrates LNBs 202 and 204, each having a receive areas delimited by a corresponding lobe 302, 304. In other words, satellite signals transmitted by satellites positioned within the respective areas can be received by the corresponding LNB 202, 204.

Figure 1:
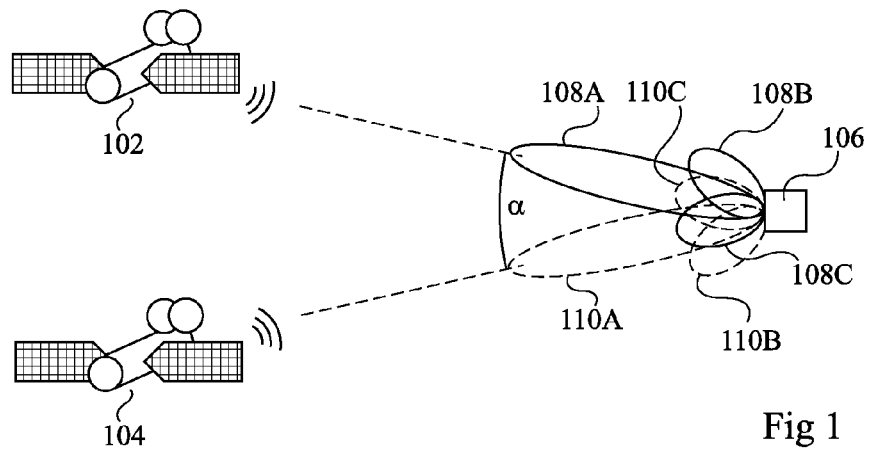
FIG. 1 (described above) illustrates part of a satellite system.

In the example of FIG. 3A, three satellites 306, 308 and 310 are present, each being separated from the next by an angle β, which is for example in the range 2 to 5 degrees of longitude. For example, the satellites 306 and 310 are positioned at 6 degrees of longitude apart, in a similar fashion to the satellites 102 and 104 of FIG. 1, while an extra satellite 308 is placed between these two satellites.

The LNB 202 is for example directed at a location 312 approximately two-thirds of the way from satellites 308 to satellite 306, while the LNB 204 is for example directed at a location 314 approximately two-thirds of the way from satellite 308 to satellite 310. The receive area 302 of LNB 202 encompasses the two satellites 306 and 308, and thus signals from both of these satellites are received by LNB 202 at the same time. The receive area 304 of LNB 204 encompasses the two satellites 308 and 310, and thus the signals from both of these satellites are both received by LNB 204 at the same time. On the other hand, the satellite signal from satellite 306 is not received by LNB 204, and the satellite signal from satellite 310 is not received by LNB 202, these satellites being outside the respective receive areas.

Figure 3B:
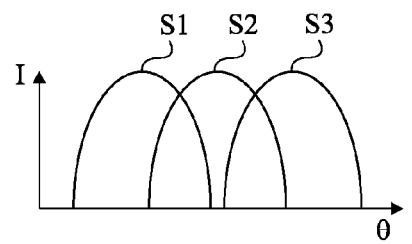
FIGS. 3B and 3C illustrate the spatial intensity of satellite signals received via the satellite receive unit of FIG. 2 according to the present invention.

FIG. 3B illustrates the angular intensity of the signals S1, S2 and S3 from the satellites 302, 304 and 306 respectively at the level of the LNBs 202, 204. As illustrated, there is an overlap between these signals, due to the close positioning of the satellites.

Figure 3C:
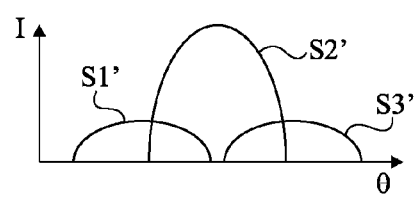

FIG. 3C illustrates the signals after the weighting function has been applied by the satellite signal processing unit 206 of FIG. 2, in this case such that the signal S2 from satellite 308 is extracted. This, for example, involves applying weighting coefficients to the signals from each of the LNBs 202 and 204, using coefficients C0=0.5+0j and C1=0.5+0j, and then adding these signals by adder 224, such that the portions of the signals in common between both signals are increased by the addition, while the portions corresponding to satellites 302 and 306 are proportionally decreased, as represented in FIG. 3C.

Alternatively, assuming that satellite signal S1 from satellite 306 is the desired satellite signal, a weighting of 1 is applied to the signal from LNB 202, by applying a coefficient C0=1+0j, while a phase shift of π radians and weighting of 50 percent is applied to the signal from LNB 204, by applying a coefficient C1=−0.5j. When the two weighted signals are then added, the satellite signal S2 received via LNB 204 will cancel with a portion of satellite 308 received via LNB 202, and the signal from satellite 310 received via LNB 204 will be reduced by 50 percent. Thus the signal from satellite 306 will be favored. In a similar fashion, if the signal S3 from satellite 310 is to be received, coefficients C0=0.5j and C1=−1+0j could be applied.

Figure 4:
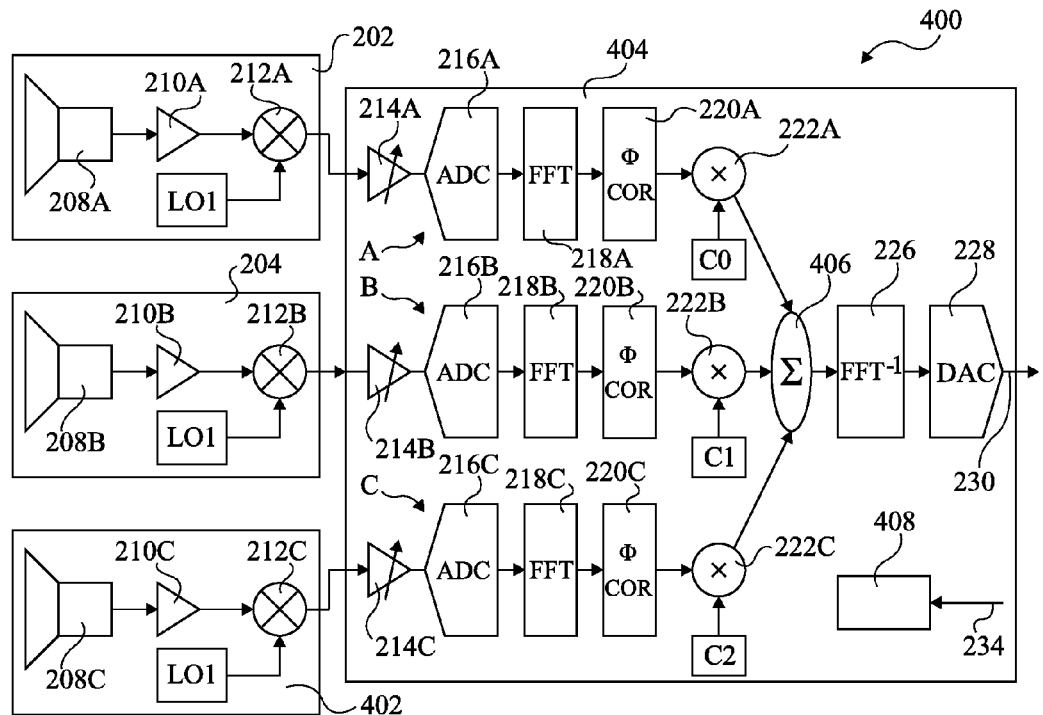
FIG. 4 illustrates a satellite receive unit according to a further embodiment of the present invention.

FIG. 4 illustrates a receive unit 400 according to an alternative embodiment comprising LNBs 202 and 204, which are the same as those of FIG. 2 and will not be described again in detail, and a further LNB 402. LNB 402 is for example identical to LNBs 202 and 204, comprising a receive head 208C, a low noise amplifier 210C, a mixer 212C and a local oscillator L01. While LNB 402 receives a satellite signal of a same polarization as the LNBs 202, 204, the frequency band received by the LNB 402 could be the same as the frequency band received by one or both of LNBs 202, 204, or a frequency band at least partially overlapping each of these frequency bands.

The satellite processing unit 404 of FIG. 4 is similar to the satellite processing unit 206 of FIG. 2, but in addition to the branches A and B, comprises a further branch C for processing the signal from LNB 402, branch C comprises a variable amplifier 214C, an ADC 216C, an FFT block 218C, a phase correction block 220C and a multiplier 222C. The phase correction block 220C applies a phase correction Φ2 to the signal received via the LNB 402, and the multiplier 222C multiples the phase corrected signal by a coefficient C2. While the phase correction block 220C and multiplier 222C are shown as separate blocks, these blocks could be combined as a single block performing a single multiplication operation for phase correction and weighting, based on a coefficient C2'=C2×Φ2.

The satellite processing unit 404 comprises an adder 406 which adds the signals from each of the multipliers 222A, 222B and 222C. As with block 206 of FIG. 2, an inverse FFT block 226 and DAC 228 are provided after the adder, and supply the selected satellite signal on the output cable 230.

The satellite processing unit 404 also comprises a control block 408, which is similar to the control block 242 of FIG. 2, but additionally provides a phase correction value to the block 220C and coefficient C2 to the multiplier 222C.

Operation of the satellite receive unit 400 of FIG. 4 will now be described further with reference to FIG. 5.

Figure 5:
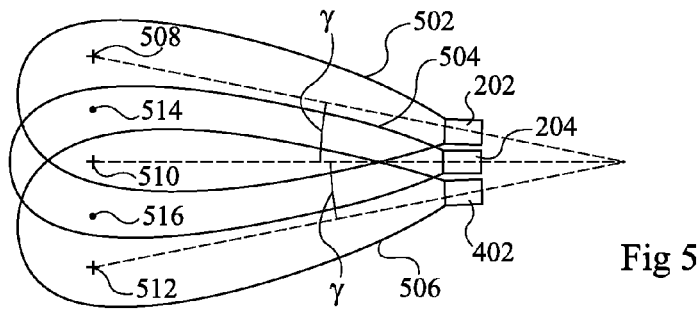
FIG. 5 illustrates satellite positioning according to the embodiment of the receive unit of FIG. 4.

FIG. 5 illustrates the LNBs 202, 204 and 402, each having a receive area delimited by lobes 502, 504 and 506 respectively. In this embodiment there are three satellites 508, 510 and 512 in geostationary orbit. The LNB 202 is for example aimed at the point 514 halfway between satellites 508 and 510, while the LNB 402 is for example aimed at a point 516 halfway between the satellites 510 and 512. The LNB 204 is for example aimed directly at satellite 510.

The satellites 508, 510 and 512 are, for example, each separated by an angle $\gamma$, which is for example in the range 1 to 5 degrees.

In this embodiment, because the central LNB 204 receives only, or predominantly, the signal from satellite 510, the phase of this signal can be inversed to aid reception of signals from satellites 508 and 512. Thus, to receive a signal S1 from satellite 508, coefficients C0=1+0j, C1=−0.3j and C2=0 are for example used for the signals from LNBs 202, 204 and 402 respectively. Alternatively, to receive a signal S2 from satellite 510, the coefficients are for example C0=0.5, C1=1+j and C2=0.5j, while to receive a signal S3 from satellite 512, the coefficients are for example C0=0, C1=−0.3j and C2=1+0j.

Figure 6:
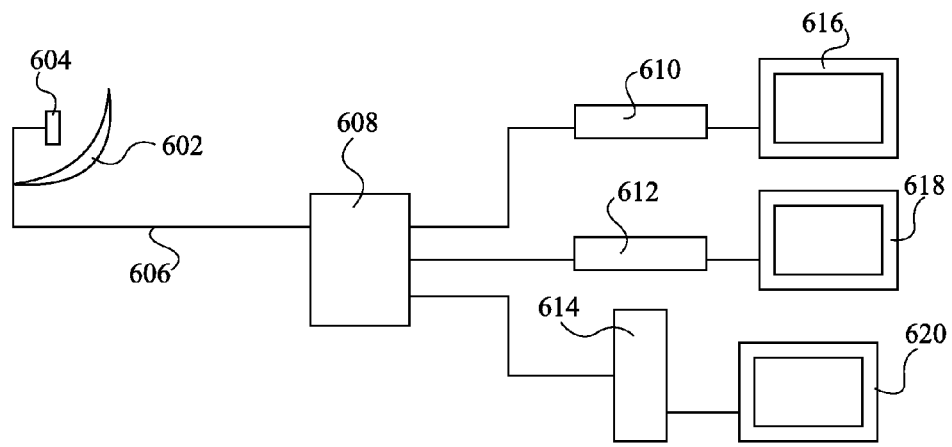
FIG. 6 illustrates a satellite receiving system according to an embodiment of the present invention.

FIG. 6 illustrates a satellite receive system 600 comprising a parabolic satellite dish 602 having a receive unit 604 mounted at its focal point, and a transmission interface 606 coupling the receive unit 602 to an interior distribution block 608. The receive unit 604 for example corresponds to the receive unit 200 or 400 described above. The interior distribution block 608 is preferably connected to the LNB 604 by a single cable and for example provides some amplification, and splits the satellite signal to satellite decoders 610, 612 and 614, each associated with the corresponding display 616, 618 and 620. The satellite decoders 610 and 612 are for example set-top boxes, while the satellite decoder 614 is for example a PC or the like. The transmission interface 606 corresponds to the transmission cable 230 shown in FIGS. 2 and 4, or a wireless interface.

The various decoders 610, 612 and 614 receive the same signal taken from a given satellite. In some embodiments, the satellite from which this signal is received could be changed periodically, based on the channels that the users wish to view. Alternatively, the users have a contract for receiving satellite signals from one of the satellites, and a receive unit capable of receiving a signal from any satellite could be "tuned" during installation to one satellite selected by the user.

An advantage of the embodiments described herein is that the signals from multiple LNBs, each of which receives satellite signals from more than one satellite, are processed in a simple manner in order to extract a single satellite signal transmitted by a single satellite. This is achieved by multiplying the signals received via each LNB by a different coefficient, in order to weight the signals differently, and then adding the signals together. Advantageously, this allows satellites to be separated by a distance corresponding to less than 6 degrees of longitude, for example of between 1 and 5 degrees of longitude.

Advantageously, in some embodiments, the satellite signals are converted into digital signals in the frequency domain for processing, allowing the signals to be processed with relatively high precision.

Having thus described at least one illustrative embodiment of the invention, various alterations, modifications and improvements will readily occur to those skilled in the art.

For example, it will be apparent to those skilled in the art that while embodiments with three satellites have been described, the invention may be applied to systems with just two satellites positioned close together, for example less than 6 degrees or between 2 and 5 degrees of longitude apart, in which at least one of the LNBs receives the satellite signal from both satellites. Furthermore, the embodiments described herein could be extended to systems with four or more satellites, and with three or more LNBs.

Furthermore, it will be apparent to those skilled in the art that the order of the functions performed in the satellite signal processing units 206, 404 could be modified. For example, rather than adding the signals from the branches prior to performing the inverse FFT, the addition by adders 224, 406 could be performed after an inverse FFT is applied to each branch. In this case, each of the branches A and B, and in the embodiment of FIG. 4 the branch C, comprises an inverse FFT bloc, and for example also a DAC, the addition of the signals being performed in the analog domain. Furthermore, the multiplication by coefficients C0, C1 and in the case of unit 406 C2 could be performed before the FFTs 216 of each branch, or between the FFTs 216 and the phase correction blocks 220 of each branch.

Additionally, it will be apparent to those skilled in the art that the orientation of the LNBs could be different, depending on the particular combination of LNBs/satellites.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting.

The invention is limited only as defined in the following claims and the equivalents thereto.

What is claimed is:

1. A satellite receive unit for receiving a plurality of satellite signals from a plurality of satellites, the satellite receive unit comprising:
   a plurality of low noise blocks, each low noise block of the plurality of low noise blocks for receiving one or more of the plurality of satellite signals and providing a signal, at least one of the plurality of low noise blocks receiving more than one satellite signal of the plurality of satellite signals; and
   a satellite signal processing unit comprising:
      a plurality of branches each arranged to receive a corresponding signal from at least one low noise block of the plurality of low noise blocks, each branch of the plurality of branches comprising a multiplier arranged to weight the corresponding received signal by multiplying said corresponding signal by a corresponding coefficient; and
      an adder arranged to add weighted signals provided by the plurality of branches to generate an output satellite signal.

2. The satellite receive unit of claim 1, wherein each of said plurality of low noise blocks is arranged to receive more than one satellite signal from the plurality of said satellite signals.

3. The satellite receive unit of claim 1, wherein at least two of said plurality of low noise blocks are arranged to receive a plurality of said satellite signals, and at least one of said low noise blocks is arranged to receive a single satellite signal.

4. The satellite receive unit of claim 1, wherein each branch of the plurality of branches in the satellite signal processing unit comprises an analog to digital converter arranged to convert the signal provided from each of said low noise blocks into a digital signal.

5. The satellite receive unit of claim 4, wherein the satellite signal processing unit further comprises a Fourier transform block arranged to transform the digital signal from said analog to digital converter into a frequency domain, wherein the multiplication performed by said multiplier and the addition performed by said adder are performed in the frequency domain, the satellite receive unit further comprising an inverse Fourier Transform block arranged to reconvert the output satellite signal into a time domain signal.

6. The satellite receive unit of claim 1, wherein the multiplier in each branch of the plurality of branches is arranged to multiply the corresponding received signal by a coefficient determined based on a selected satellite signal indicated to be extracted as the output satellite signal.

7. The satellite receive unit of claim 1, wherein the satellite signal processing unit further comprises, in each branch of the plurality of branches, a phase correction block arranged to introduce a phase adjustment to the corresponding received signal.

8. The satellite receive unit of claim 1, wherein said satellite signal processing unit comprises at least three branches.

9. The satellite receive unit of claim 1, comprising three low noise blocks, each arranged to receive a plurality of satellite signals.

10. The satellite receive unit of claim 1, comprising an input indicating which of the plurality of satellite signals is to be output by the satellite receive unit as the output satellite signal.

11. A satellite receive system comprising the satellite receive unit of claim 1 and a transmission means arranged to transmit the output satellite signal from said satellite signal processing unit to at least one satellite decoder.

12. A satellite system comprising at least two satellites separated by 5 or less degrees of longitude and the satellite receive unit of claim 1.

13. A satellite system comprising at least three satellites each separated from at least one of the other two satellites by 5 or less degrees of longitude and the satellite receive unit of claim 1.

14. A method of receiving a plurality of satellite signals from a plurality of satellites, the method comprising:
receiving, by each of a plurality of low noise blocks, one or more satellite signals of said plurality of satellite signals, at least one low noise block from the plurality of low noise blocks receiving more than one satellite signal from the plurality of satellite signals; by each of a plurality of branches, receiving a corresponding signal from at least one low noise block of the plurality of low noise blocks, and multiplying the corresponding received signal by a corresponding coefficient to provide a weighted signal; and
adding, by an adder, weighted signals provided the plurality of branches to generate an output satellite signal.

15. The satellite receive unit of claim 8, wherein each of at least three branches comprises a phase correction module and a multiplier.

16. The method of claim 14, further comprising:
receiving an indication of a satellite signal to be extracted as the output satellite signal; and
selecting the corresponding coefficient based on the output satellite signal.

17. The method of claim 14, wherein:
each of the plurality of low noise blocks is configured to receive at least two different satellite signals at the same time.

18. The method of claim 14, further comprising:
introducing a phase adjustment to the corresponding received signal.

19. The method of claim 14, wherein:
each two satellites from the plurality of satellites are separated by 5 or less degrees of longitude from each other.

20. A system for receiving a plurality of satellite signals from a plurality of satellites, the system comprising:
a satellite receive unit comprising:
a plurality of low noise blocks, each low noise block of the plurality of low noise blocks for receiving one or more of the plurality of satellite signals and providing a signal, at least one of the plurality of low noise blocks receiving more than one satellite signal of the plurality of satellite signals; and
a satellite signal processing unit comprising:
a plurality of branches each arranged to receive a corresponding signal from at least one low noise block of the plurality of low noise blocks, each branch of the plurality of branches comprising a multiplier arranged to weight the corresponding received signal by multiplying said corresponding signal by a corresponding coefficient; and
an adder arranged to add weighted signals provided by the plurality of branches to generate an output satellite signal.

21. The system of claim 20, wherein:
each of said plurality of low noise blocks is arranged to receive more than one satellite signal from the plurality of satellite signals.

22. The system of claim 20, wherein:
at least two of said plurality of low noise blocks are arranged to receive a plurality of the satellite signals, and at least one of the low noise blocks is arranged to receive a single satellite signal.

23. The system of claim 20, wherein:
each branch of the plurality of branches in the satellite signal processing unit comprises an analog to digital converter arranged to convert the signal provided from each of the low noise blocks into a digital signal.

24. The system of claim 23, wherein:
the satellite signal processing unit further comprises a Fourier transform block configured to transform the digital signal from the analog to digital converter into a frequency domain, wherein the multiplication performed by the multiplier and the addition performed by the adder are performed in the frequency domain, the satellite receive unit further comprising an inverse Fourier Transform block arranged to reconvert the output satellite signal into a time domain signal.

25. The system of claim 20, wherein:
the multiplier in each branch of the plurality of branches is arranged to multiply the corresponding received signal by a coefficient determined based on a selected satellite signal indicated to be extracted as the output satellite signal.

26. The system of claim 20, wherein:
the satellite signal processing unit further comprises, in each branch of the plurality of branches, a phase correction block arranged to introduce a phase adjustment to the corresponding received signal.

27. The system of claim 20, wherein:
the satellite signal processing unit comprises at least three branches.

28. The system of claim 20, wherein:
the satellite receive unit comprises three low noise blocks, each arranged to receive a plurality of satellite signals.

29. The system of claim 20, wherein:
the satellite receive unit comprises an input indicating which of the plurality of satellite signals is to be output by the satellite receive unit as the output satellite signal.

30. The system of claim 20, further comprising:
a transmission unit configured to transmit the output satellite signal from the satellite signal processing unit to at least one satellite decoder.

31. The system of claim 20, further comprising:
at least two satellites separated by 5 or less degrees of longitude.

32. The system of claim 20, further comprising:
at least three satellites each separated from at least one of the other two satellites by 5 or less degrees of longitude.

* * * * *

UNITED STATES PATENT AND TRADEMARK OFFICE
CERTIFICATE OF CORRECTION

PATENT NO.        : 8,755,741 B2
APPLICATION NO.   : 12/902598
DATED             : June 17, 2014
INVENTOR(S)       : Busson Page 1 of 1

It is certified that error appears in the above-identified patent and that said Letters Patent is hereby corrected as shown below:

**In the Specification:

Column 1, line 54, please delete the letter "a" in the sentence and replace it with the symbol --α--;

Column 4, line 60, please remove the word "to"; and

Column 6, line 48, the term "L01" should read as: --LO1--.**

Signed and Sealed this
Twenty-sixth Day of August, 2014

Michelle K. Lee
*Deputy Director of the United States Patent and Trademark Office*